US012657396B2

(12) United States Patent (10) Patent No.: US 12,657,396 B2

Ajgaonkar et al. (45) Date of Patent: Jun. 16, 2026

(54) NEGOTIATION TRAINING FRAMEWORK USING GENERATIVE ARTIFICIAL INTELLIGENCE

(71) Applicant: Insight Direct USA, Inc., Chandler, AZ (US)

(72) Inventors: Amol Ajgaonkar, Chandler, AZ (US); Joseph Raymond Flynn, Hackettstown, NJ (US)

(73) Assignee: Insight Direct USA, Inc., Chandler, AZ (US)

( * ) Notice: Subject to any disclaimer, the term of this patent is extended or adjusted under 35 U.S.C. 154(b) by 152 days.

(21) Appl. No.: 18/490,921

(22) Filed: Oct. 20, 2023

(65) Prior Publication Data

US 2025/0094723 A1 Mar. 20, 2025

Related U.S. Application Data

(60) Provisional application No. 63/584,005, filed on Sep. 20, 2023.

(51) Int. Cl.
| | |
|---|---|
| *G06F 40/35* | (2020.01) |
| *G06Q 10/0639* | (2023.01) |
| *G06T 13/40* | (2011.01) |

(52) U.S. Cl.
CPC ....... *G06F 40/35* (2020.01); *G06Q 10/06398* (2013.01); *G06T 13/40* (2013.01)

(58) Field of Classification Search
None
See application file for complete search history.

(56) References Cited

U.S. PATENT DOCUMENTS

| | | | |
|---|---|---|---|
| 10,133,999 | B2 | 11/2018 | Raanani et al. |
| 10,565,634 | B2 | 2/2020 | Talmor et al. |
| 11,257,496 | B2 | 2/2022 | Chakraborty |
| 11,531,821 | B2 | 12/2022 | Xie et al. |
| 2019/0286712 | A1* | 9/2019 | Terry ..................... H04L 51/02 |
| 2020/0395008 | A1 | 12/2020 | Cohen et al. |
| 2022/0012667 | A1 | 1/2022 | Pripstein et al. |
| 2022/0277149 | A1 | 9/2022 | Altschul et al. |
| 2023/0080724 | A1 | 3/2023 | Stoops et al. |
| 2023/0164098 | A1 | 5/2023 | Cai et al. |
| 2024/0412720 | A1* | 12/2024 | Vasylyev .......... G06F 16/90332 |

FOREIGN PATENT DOCUMENTS

CA 3193583 A1 3/2022

* cited by examiner

*Primary Examiner* — Quynh H Nguyen
(74) *Attorney, Agent, or Firm* — Kinney & Lange, P.A.

(57) ABSTRACT

A system for training a user for a conversational encounter with a customer receives encounter-defining parameters via a user interface. The encounter-defining parameters are descriptive of attributes of the conversational encounter. The system formats the encounter-defining parameter for transmission to a large language model (LLM). The LLM receives the instructions and outputs a conversational opening viewable by a user via a user interface. The user then responds to the conversational opening and iteratively converses with the LLM. After a defined maximum number of iterations have been reached, the LLM provides an evaluation to the user via the user interface. The evaluation is indicative of the evaluated outcome of the conversational encounter, including at least one of a score, a summary of the encounter, a likelihood that a deal is reached, and suggested improvements.

26 Claims, 6 Drawing Sheets

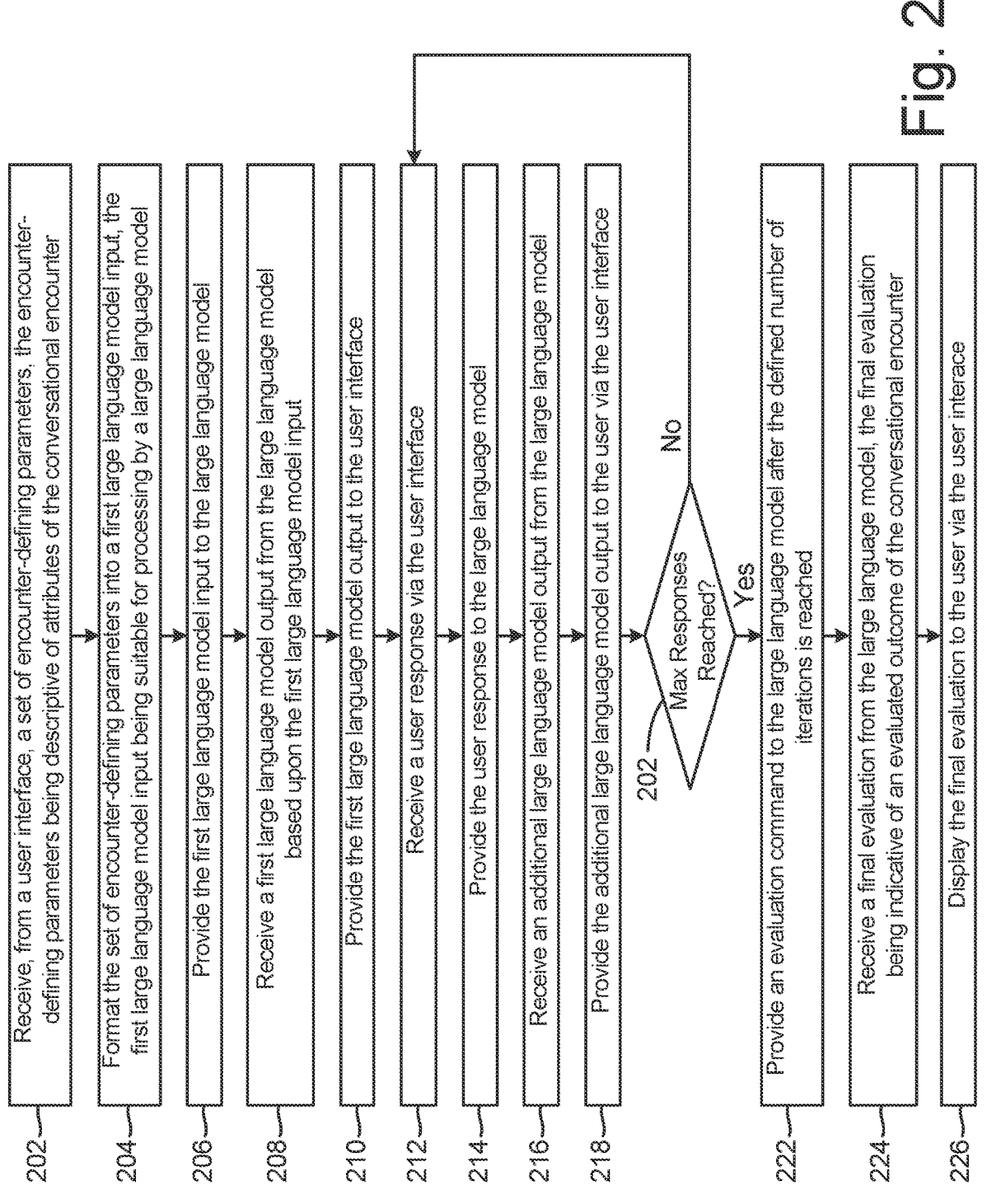

202 — Receive, from a user interface, a set of encounter-defining parameters, the encounter-defining parameters being descriptive of attributes of the conversational encounter 204 — Format the set of encounter-defining parameters into a first large language model input, the first large language model input being suitable for processing by a large language model 206 — Provide the first large language model input to the large language model 208 — Receive a first large language model output from the large language model based upon the first large language model input 210 — Provide the first large language model output to the user interface 212 — Receive a user response via the user interface 214 — Provide the user response to the large language model 216 — Receive an additional large language model output from the large language model 218 — Provide the additional large language model output to the user via the user interface 202 — Max Responses Reached?　No　Yes 222 — Provide an evaluation command to the large language model after the defined number of iterations is reached 224 — Receive a final evaluation from the large language model, the final evaluation being indicative of an evaluated outcome of the conversational encounter 226 — Display the final evaluation to the user via the user interface

Fig. 2

NEGOTIATION TRAINING FRAMEWORK USING GENERATIVE ARTIFICIAL INTELLIGENCE

BACKGROUND

Training sales associates is necessary and desirable for an organization wishing to enhance a sales program. Sales associates can be trained on demeanor as well as content in order to effectively sell products or services. Sales training, however, can be ineffective if it does not consider the uniqueness of each customer. Further, sales training can be ineffective if it is static and does not provide feedback for improvement of the sales associates. Therefore, an improved system for training sales associates with consideration of customer uniqueness and user feedback is desirable.

SUMMARY

A system for using generative artificial intelligence (AI) for training a user for a conversational encounter with a customer includes a processor, an input/output device, and computer-readable memory. The input/output device is configured to receive user inputs and to display outputs at a user interface. The computer-readable memory is encoded with instructions that, when executed by the processor, cause the system to perform the following steps. The system receives, from the user interface, a set of encounter-defining parameters, the encounter-defining parameters being descriptive of attributes of the conversational encounter. The system formats the set of encounter-defining parameters into a first large language model input, the first large language model input being suitable for processing by a large language model. The system provides the large language model input to the large language model. The system receives a first large language model output from the large language model based upon the first large language model input. The system provides the first large language model output to the user via the user interface. The system iteratively converses, via the user interface, with the user for a defined number of iterations. Iteratively conversing with the user includes the steps of receiving a user response via the user interface, providing the user response to the large language model, receiving an additional large language model output from the large language model, and providing the additional large language model output to the user via the user interface. The system provides an evaluation command to the large language model after the defined number of iterations is reached. The system receives a final evaluation from the large language model, the final evaluation being indicative of an evaluated outcome of the conversational encounter. The system displays the final evaluation to the user via the user interface.

A method for training a user for a conversational encounter with a customer includes receiving from a user interface, a set of encounter-defining parameters, the encounter-defining parameters being descriptive of attributes of the conversational encounter. The method further includes formatting the set of encounter-defining parameters into a first large language model input, the first large language model input being suitable for processing by a large language model. The method further includes providing the large language model input to the large language model. The method further includes receiving a first large language model output from the large language model based upon the first large language model input. The method further includes providing the first large language model output to the user via the user interface. The method further includes iteratively conversing, via the user interface, with the user for a defined number of iterations, wherein iteratively conversing with the user includes the steps of receiving a user response via the user interface, providing the user response to the large language model, receiving an additional large language model output from the large language model, and providing the additional large language model output to the user via the user interface. The method further includes providing an evaluation command to the large language model after the defined number of iterations is reached. The method further includes receiving a final evaluation from the large language model, the final evaluation being indicative of an evaluated outcome of the conversational encounter. The method further includes displaying the final evaluation to the user via the user interface.

BRIEF DESCRIPTION OF THE DRAWINGS

FIG. 2 is a flowchart of a method for using generative artificial intelligence (AI) to train the user.

DETAILED DESCRIPTION

According to the techniques of this disclosure, a user training application uses a large language model to power a conversational AI that can then train a user. The user training application includes encounter-defining parameters, which can include customer personality, a customer mood, a customer industry, a customer role, a team requirement and/or a business requirement. The encounter-defining parameters are provided to a large language model and a chat session is started with the user. The user iteratively converses, via the user interface, with the large language model for a defined number of iterations. After the defined number of iterations is reached, the user is provided with an evaluation including a score, a summary, a deal result, and suggested improvements. The techniques of this disclosure advantageously allow for training the user via the conversational interface, such that the evaluation provided to the user is tailored to the user to provide personalized recommendations.

Figure 1:
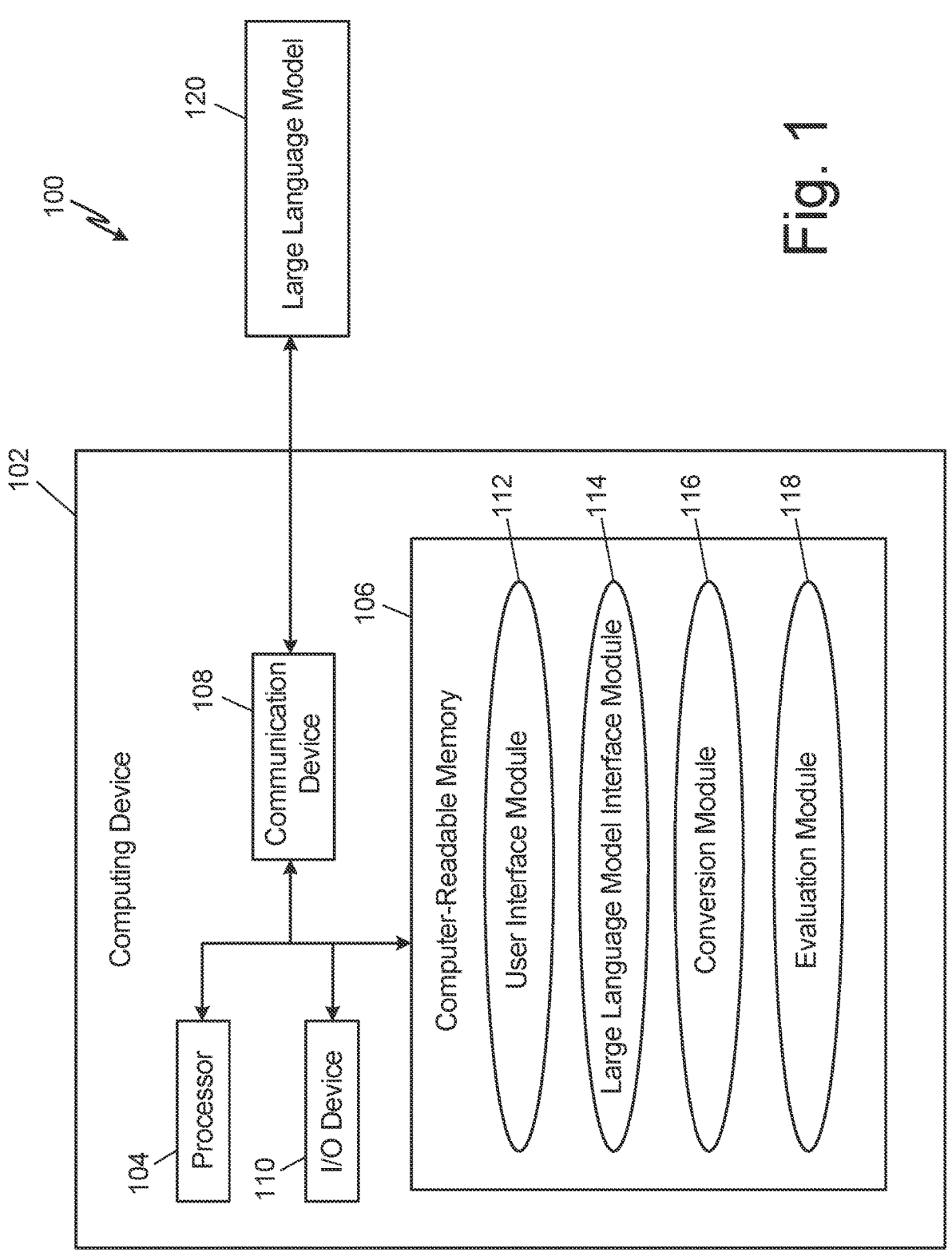
FIG. 1 is a diagram of a system for using generative artificial intelligence (AI) to train a user.

FIG. 1 is a diagram of system 100 for using generative artificial intelligence (AI) to train a user. System 100 includes computing device 102 and large language model 120. Computing device 102 includes processor 104, computer-readable memory 106, communication device 108, and input/output device 110. Computer-readable memory 106 includes user interface module 112, large language model interface module 114, conversation module 116, and evaluation module 118.

Processor 104, in some examples, is configured to implement functionality and/or process instructions for execution within system 100. For instance, processor 104 can be capable of processing instructions stored in computer-readable memory 106. Examples of processor 104 can include any one or more of a microprocessor, a controller, a digital signal processor (DSP), an application specific integrated circuit (ASIC), a field-programmable gate array (FPGA), or other equivalent discrete or integrated logic circuitry.

Computer-readable memory 106, in some examples, is described as computer-readable storage media. In some examples, a computer-readable storage medium includes a non-transitory medium. The term "non-transitory" indicates that the storage medium is not embodied in a carrier wave or a propagated signal. In certain examples, a non-transitory storage medium stores data that, over time, changes (e.g., in RAM or cache). In some examples, computer-readable memory 106 is a temporary memory, meaning that a primary purpose of computer-readable memory 106 is not long-term storage. Computer-readable memory 106, in some examples, is described as volatile memory, meaning that computer-readable memory 106 does not maintain stored contents when electrical power to computer-readable memory 106 is removed. Examples of volatile memories can include random access memories (RAM), dynamic random access memories (DRAM), static random access memories (SRAM), and other forms of volatile memories. In some examples, computer-readable memory 106 is used to store program instructions for execution by processor 104. Computer-readable memory 106, in one example, is used by software or applications to temporarily store information during program execution.

Computer-readable memory 106, in some examples, also includes one or more computer-readable storage media. Computer-readable memory 106 is configured to store larger amounts of information than volatile memory. Computer-readable memory 106 is further configured for long-term storage of information. In some examples, computer-readable memory 106 includes non-volatile storage elements. Examples of such non-volatile storage elements include, but are not limited to, magnetic hard discs, optical discs, flash memories, or forms of electrically programmable memories (EPROM) or electrically erasable and programmable (EEPROM) memories.

Input/output device 110 is configured to receive inputs for system 100 and to provide outputs generated by system 100 for use by a user and/or other consuming system of such outputs. For example, input/output device 110 can include input elements in the form of a mouse, a keyboard, a microphone, a camera device, a presence-sensitive and/or touch-sensitive display, or other type of device configured to receive input from a user. In certain examples, input/output device 110 can include communication devices usable to communicate with external devices via one or more wired or wireless networks, or both. For instance, communication devices can take the form of a network interface card (e.g., an Ethernet card), an optical transceiver, a radio frequency transceiver, or other type of device that can send and receive information, such as Bluetooth, and/or 3G. Input/output device 110 can also include output elements, such as a display device, a sound card, a video graphics card, a speaker, a cathode ray tube (CRT) monitor, a liquid crystal display (LCD), a light emitting diode (LED) display, an organic light emitting diode (OLED) display, or other type of device for outputting information in a form understandable to users or machines.

Processor 104, computer-readable memory 106, communication device, and input/output device 110 are interconnected within computing device 102. Communication device 108 is operably connected to large language model

120. Large language model 120 is depicted as being external to computing device 102. In some embodiments, large language model 120 is hosted on a cloud server external to computing device 102. In other embodiments, large language model 120 is hosted on a local server external to computing device 102. In still other embodiments, large language model 120 can be hosted on a server contained within computing device 102.

In operation, computer-readable memory 106 is encoded with instructions that are executed by processor 104. Computer-readable memory includes user interface module 112, which includes one or more programs for generating and displaying a user interface via input/output device 110. The program(s) of user interface module 112 can be executed by processor 104. The user interface generated via the execution user interface module 112 is configured to display, via input/output device 110, elements allowing the user to set up encounter-defining parameters for a conversational encounter with a customer. The encounter-defining parameters can include at least one of a customer personality, a customer mood, a customer industry, a customer role, a team requirement and/or a business requirement. The user interface also displays, via input/output device 110, a chat interface in which the user can converse with a generative artificial intelligence model, such as large language model 120. The user interface generated via the execution of user interface module and displayed via input/output device 110 will be described in greater detail in the description of FIGS. 3A-3B below.

Computer-readable memory 106 includes large language model interface module 114, which includes one or more programs for interfacing with large language model 120 via communication device 108. The program(s) of large language model interface module 114 can be executed by processor 104. Upon execution of large language model interface module 114, processor 104 formats the encounter-defining parameters received from the user interface into a first large language model input. Communication device 108 transmits the first large language model input from processor 104 to large language model 120. Thus, after execution of large language model interface module 114, large language model 120 is provided with the necessary information to simulate the customer and situation as defined by the encounter-defining parameters.

Computer-readable memory 106 includes conversation module 116, which can include one or more programs for iteratively conversing with large language model 120 via the user interface of input/output device 110. The program(s) of conversation module 116 can be executed by processor 104. Upon execution of conversation module 116, a first large language model output is received by communication device 108 from large language model 120. First large language model output is generated by large language model 120 in response to first large language model input. The first large language model output is processed and formatted by processor 104 for viewing within the user interface displayed via input/output device 110. The user can iteratively converse with the simulated customer generated by large language model 120 for a defined number of iterations. Iteratively conversing with the simulated customer can involve the user inputting a response to the simulated customer within the user interface of input/output device 110, sending the response to large language model 120 via communication device 108, receiving a subsequent response from large language model 120 via communication device 108, and viewing the subsequent response from large language model 120 via the user interface of input/output device 110. This process is repeated for the defined number of iterations. In some embodiments, the defined number of iterations is defined via the user interface. In other embodiments, the defined number of iterations is fixed prior and unchangeable from the user interface.

Computer-readable memory includes evaluation module 118, which includes one or more programs for generating an evaluation of the user interaction with the simulated customer from large language model 120, and for displaying such an evaluation via input/output device 110. The program(s) of evaluation module 118 can be executed by processor 104. Evaluation module 118 is executed when the maximum number of conversational iterations is reached with large language model 120. Upon execution of evaluation module 118, large language model 120 returns an evaluation of the user interaction with the simulated customer to processor 104 via communication device 108. The evaluation can include a numerical score on a defined scale, wherein the numerical score is indicative of the quality and likelihood of success in the interaction between the user and the simulated customer. The evaluation can also include a summary of the user response. The evaluation can also include a deal result, wherein the deal result is indicative of whether a deal was successfully made between the user and the simulated customer. The evaluation can also include one or more suggested improvements for the user based upon an evaluation of the conversational encounter. Once received by processor 104 from large language model 120, the evaluation is displayed to the user via the user interface of input/output device 110.

System 100 provides various advantages. System 100 allows for a user to converse with a generative AI model, such as large language model 120, in order to receive the benefit of training for a conversational encounter. For example, the conversational encounter may be a simulated sales conversation. In such a case, the user is able to evaluate their proficiency at closing a sale based upon encounter-defining parameters. Thus, the user can practice with various customer moods, personalities, industries, and roles. The user can also practice with various situational elements such as various team requirements and business requirements. The customizability of encounter-defining parameters therefore gives a wide range of scenarios for the user to receive training. Furthermore, system 100 is advantageous because it provides an evaluation to the user, wherein the evaluation is indicative of the quality of the conversational encounter. Thus, the user is left with feedback on their proficiency within the current interaction and with feedback on how to improve their proficiency with respect to future interactions. System 100 is therefore useful both for learning and improving user interactions within a variety of conversational encounters.

System 100 can also have a number of other applications in addition to the simulated sales conversation. For example, the conversational encounter of system 100 can be used for customer support or customer support training. The conversational encounter of system 100 can also be used for employee onboarding training. The conversational encounter can also be used during an interview process, wherein system 100 is used to converse with and evaluate an interview candidate. The listed applications are examples, and are intended to be non-limiting. Any number of additional conversational encounters suitable for system 100 are contemplated by this disclosure.

FIG. 2 is a flowchart of method 200 for using generative artificial intelligence (AI) to train a user. Method 200 is performable by system 100 of FIG. 1, and hence reference will be made to components of system 100 in the description of method 200.

Method 200 begins at step 202. System 100 receives, via a user interface, a set of encounter-defining parameters. The encounter-defining parameters are descriptive of attributes of the conversational encounter. The user interface is generated by the execution of user interface module 112 by processor 104. The user interface is displayed via input/output device 110. The user interface can display interactive elements for a user to define the encounter-defining parameters. The encounter-defining parameters can include at least one of a customer personality, a customer mood, a customer industry, a customer role, a team requirement and/or a business requirement. The listed parameters are intended to be non-limiting and it is understood that other encounter-defining parameters can be included to further customize the encounter. Thus, at step 202, such parameters are defined within the user interface and received by system 100.

At step 204, system 100 formats the set of encounter-defining parameters into a first large language model input. The first large language model input is suitable for processing by large language model 120. System 100 formats the set of encounter-defining parameters into a first large language model input via execution of large language model interface module 114 by processor 104. The encounter-defining parameters can include customer-defining parameters (e.g., at least one of a personality, a mood, an industry, and a customer role, a team requirement, and a business requirement) and a set of situation-defining parameters (e.g., at least one of a team requirement and a business requirement).

The first large language model input is formatted such that it provides comprehensive instructions about the conversational encounter to large language model 120. The first large language model input can, for example, include an instruction that large language model 120 should act as a customer from a particular industry, as defined in the encounter-defining parameters. The first large language model input can further include instruction that large language model 120 should inform the user as to what the customer's business requirement is, as defined in the encounter-defining parameters. The first large language model input can further include instructions to limit questions posed to the user to one question per response. The first large language model input can further include instructions on how to end the conversational encounter including defining a maximum number of responses and/or an instruction that the encounter should end early if the user does not answer the questions in a relevant manner and digresses from the conversation.

The first large language model input can include instructions instructing large language model 120 to respond in a specified format such that the text output from large language model 120 can be appropriately processed by processor 104. In one such embodiment, large language model 120 is instructed to return responses in a JSON format. This is merely an illustrative example of an appropriate format for processing, and other known data formats can be used.

The first large language model input can instruct large language model 120 to evaluate the direction of responses received from the user. The direction of the responses received from the user are indicative of the relevance of the user response. Thus, a more relevant response from the user to a question posed by large language model 120 can elicit a "warm" direction from large language model 120 while a comparatively less relevant response can elicit a "cold" direction from large language model 120.

In some embodiments, parts of the first large language model input can be textually tailored to elicit a desired response from large language model 120. For example, in defining a role of large language model 120, instructions that recite "you are the CTO of a multinational technology company" may result in large language model 120 returning a response indicating that large language model 120 is unable to assume that role as it does not have the requisite experience in the defined industry. To still achieve the desired conversational encounter, first large language model input can be modified to recite "you are a CTO for a multinational company whose personality, mood, and requirement includes . . . industry: technology." This is merely one example of how an input to a large language model can be modified in order to overcome restrictions on the large language model. Various large language models may have differing restrictions on how the large language model can be instructed to emulate a personality or role, and hence the textual tailoring of the input can be uniquely edited to elicit the desired response based upon the restrictions specific to the large language model being used.

At step 206, computing device 102 provides the first large language model input to large language model 120. Upon execution of large language model interface module 114 by processor 104, the first large language model input is transmitted to large language model 120 via communication device 108.

At step 208, computing device 102 receives a first large language model output from large language model 120 based upon the first large language model input. Processor 104 receives the first large language model output from large language model 120 via communication device 108. First large language model output can be a conversational opening statement from large language model 120 that adheres to the set of encounter-defining parameters. At step 210, computing device 102 displays the first large language model output to the user via the user interface shown on input/output device 110.

Steps 212-218 include iteratively conversing with the user via the user interface displayed on input/output device 110. The iterative conversation occurs between the user and large language model 120. Steps 212-218 occur by execution of conversation module 116 of computer-readable memory 106 by processor 104. At step 212, computing device 102 receives, via the user interface, a user response. The user enters such a response using input/output device 110. At step 214, computing device 102 provides the user response to the large language module via communication device 108. In some embodiments, computing device 102 additionally provides the conversation history to the large language model, including prior iterations of the user response and prior iterations of the large language model output. At step 216, computing device 102 receives an additional large language model output from the large language module via communication device 108. At step 218, the additional large language model output is displayed on the user interface of input/output device 110 for the user to view.

At decision step 220, processor 104 of computing device 102 evaluates whether the maximum number of responses has been reached. In some embodiments, the maximum number of responses is defined in the first large language model input. If the maximum number of responses has not been reached, computing device 102 returns to step 210 wherein the user enters another response via the user interface of input/output device 110. In some embodiments, after an iteration has been completed and a new user response is entered in the user interface at step 212, computing system 102 provides the new user response as well as any other previous user responses and additional large language model outputs to refresh the memory of the large language model. In some embodiments, computing system 102 also provides the first large language model input and the first large language model output to refresh the memory of the large language model. Thus, for every successive iteration, all of the correspondence from the preceding iterations in addition to the first large language model input and the first large language model output are provided to large language model 120.

If the maximum number of responses has been reached at decision step 220, computing device 102 proceeds to step 222. At step 222, upon execution of evaluation module 118 by processor 104, an evaluation command is provided to large language model 120 via communication device 108. The evaluation command can include a command to elicit an evaluation from large language model 120 based on the iterative conversation between the user and large language model 120. The elicited evaluation can include a numerical score on a defined scale, wherein the numerical score is indicative of the quality and likelihood of success in the interaction between the user and the simulated customer. The evaluation can also include a summary of the user response. The evaluation can also include a deal result, wherein the deal result is indicative of whether a deal was successfully made between the user and the simulated customer. The evaluation can also include one or more suggested improvements for the user based upon an evaluation of the conversational encounter.

At step 224, computing system 102 receives a final evaluation from large language model 120 via communication device 108. At step 226, the final evaluation is displayed to the user via the user interface of input/output device 110.

In some embodiments, method 200 can further involve a step of generating training materials based upon the iterative conversation between the user and the simulated customer. In such an embodiment, computer-readable memory 106 of system 100 can be encoded with instructions that, when executed by processor 104, generate a set of training materials based upon the user responses. For example, the training materials may contain suggestions on keywords or phrases that generate a positive evaluation and contain a list of words to avoid that generate a negative evaluation. Additionally or alternatively, the system can update existing training materials. In such an embodiment, existing training materials can be automatically modified by the processor to incorporate new suggestions arising out of the iterative conversation between the user and the simulated customer.

Method 200 is a method implementation of the components of system 100, and hence provides the same advantages. Namely, method 200 provides the benefit of training for a conversational encounter, with customizability of the customer based upon the encounter-defining parameters selected in first large language model input. Further, method 200 provides the advantage of adding various inputs to further enhance the quality of the conversational encounter. For example, method 200 contemplates the evaluation of a "direction" of the conversation, thereby allowing the user to have consistent feedback on the quality of user responses. Additionally, method 200 contemplates textually tailoring the inputs to large language model 120 to elicit a desired response and to overcome limitations of large language model 120. Thus, method 200 is useful for implementing the elements of system 100 in order to develop a method of training a user using a conversational encounter.

Figure 3A:
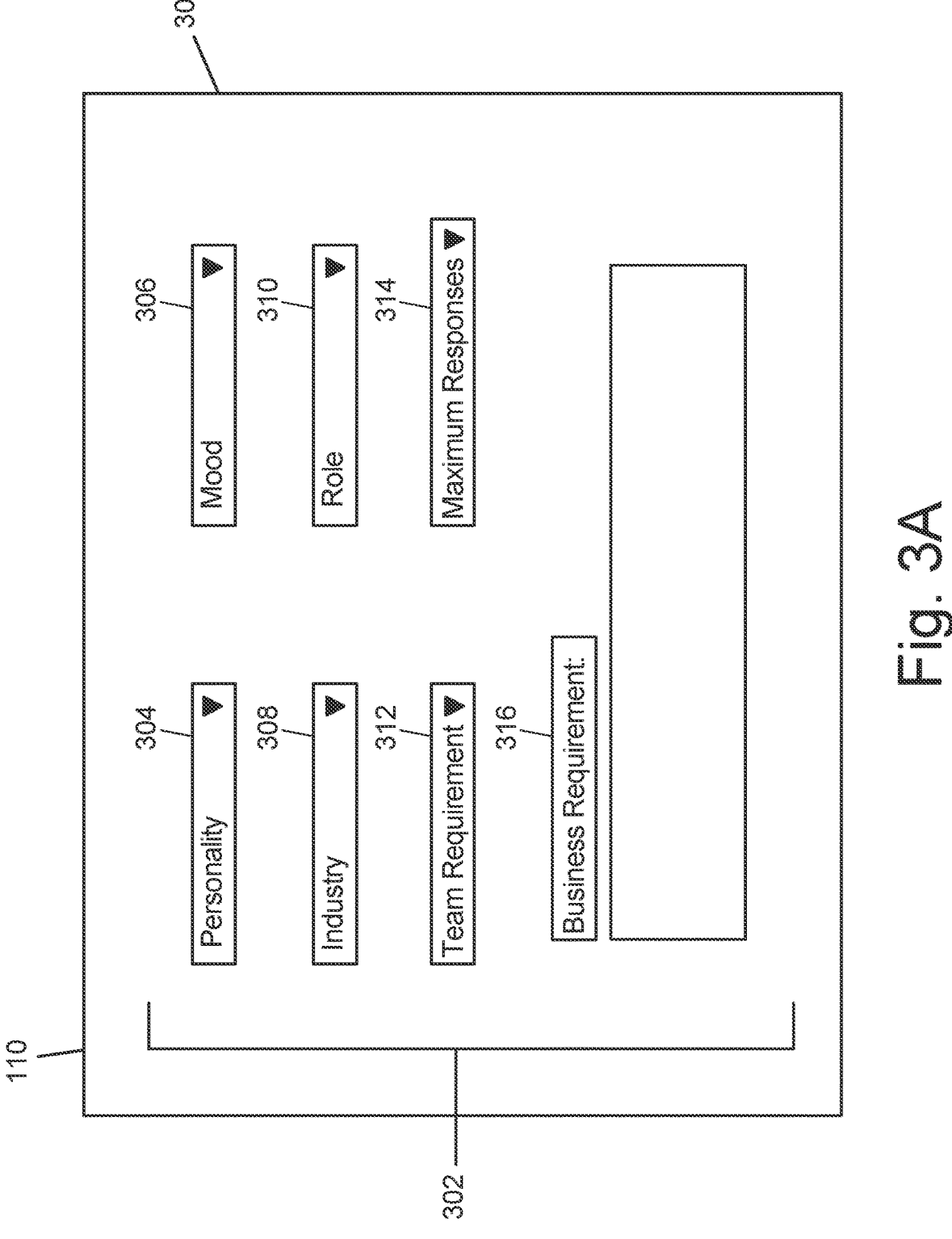
FIG. 3A is an example embodiment of a parameter defining user interface for defining encounter-defining parameters.

FIG. 3A is an example embodiment of parameter defining user interface 300 for inputting encounter-defining parameters. Parameter defining user interface 300 is displayed on input/output device 110 of system 100. Parameter defining user interface 300 includes encounter-defining parameter user interface elements 302 (hereinafter "UI elements 302"). UI elements 302 include personality element 304, mood element 306, industry element 308, role element 310, team requirement element 312, maximum response element 314, and business requirement element 316. UI elements 302 allow for the user to select the encounter-defining parameters in order to generate the first large language model input, thereby customizing the interaction with the simulated customer.

Personality element 304 is indicative of the simulated customer's personality. Any number or combination of words describing a personality can be chosen to supply to large language model 120 in order to set the personality of the simulated customer. In one example, the customer personality can be chosen from a list including difficult, eager, indifferent, skeptical, or hard negotiator. In some embodiments, a combination of multiple personalities can be selected. Thus, for example, the simulated customer can be eager and a hard negotiator.

Mood element 306 is indicative of the mood of the simulated customer. Any number or combination of words describing a mood can be chosen to supply to large language model 120 in order to set the mood of the simulated customer. In one example, the customer mood can be chosen from a list including angry, frustrated, relaxed, or open to conversation. In some embodiments, a combination of multiple moods can be selected. Thus, for example, the simulated customer can be frustrated but open to conversation.

Industry element 308 is indicative of the industry in which the simulated customer works. Any number or combination of words indicating an industry can be chosen to supply to large language model 120. In one example, the industry can be chosen from a list including manufacturing, retail, healthcare, technology, real estate, or distribution.

Role element 310 is indicative of the role of the simulated customer within the industry indicated by industry element 308. Any number or combination of words indicating a role can be chosen to supply to large language model 120. In one example, the role can be chosen from a list including CEO, CTO, CFO, procurement head, vice president, or director. As described above with respect to method 200, the large language model input containing the information about the simulated customer's industry and role can be textually tailored to elicit the desired response from large language model 120.

Team requirement element 312 is indicative of restrictions on a geographic location of the team. In one example, the team requirement can be chosen from a list including on-shore, near-shore, or off-shore.

Maximum response element 314 is indicative of the maximum number of responses to be received from large language model 120 before the conversational encounter is ended and an evaluation is provided. In some embodiments, this UI element is customizable by a user. In other embodiments, the maximum number of responses is fixed and unchangeable by a user.

Business requirement element 316 is indicative of the business requirement of the simulated customer. For example, the business requirement can be "innovative solutions to increase revenue." In some embodiments, the business requirement can include multiple objectives. For example, the multiple objectives can include increasing revenue, decreasing expenses, and increasing efficiency.

Upon defining the encounter-defining parameters via UI elements 302, communication device 108 sends the encounter-defining parameters to large language model 120 along with accompanying large language model instructions. This input to large language model 120 is the first large language model input as described above with respect to the description of FIG. 1. After sending the first large language model input to large language model 120, conversation and evaluation user interface 320 of FIG. 3B is displayed to the user.

Figure 3B:
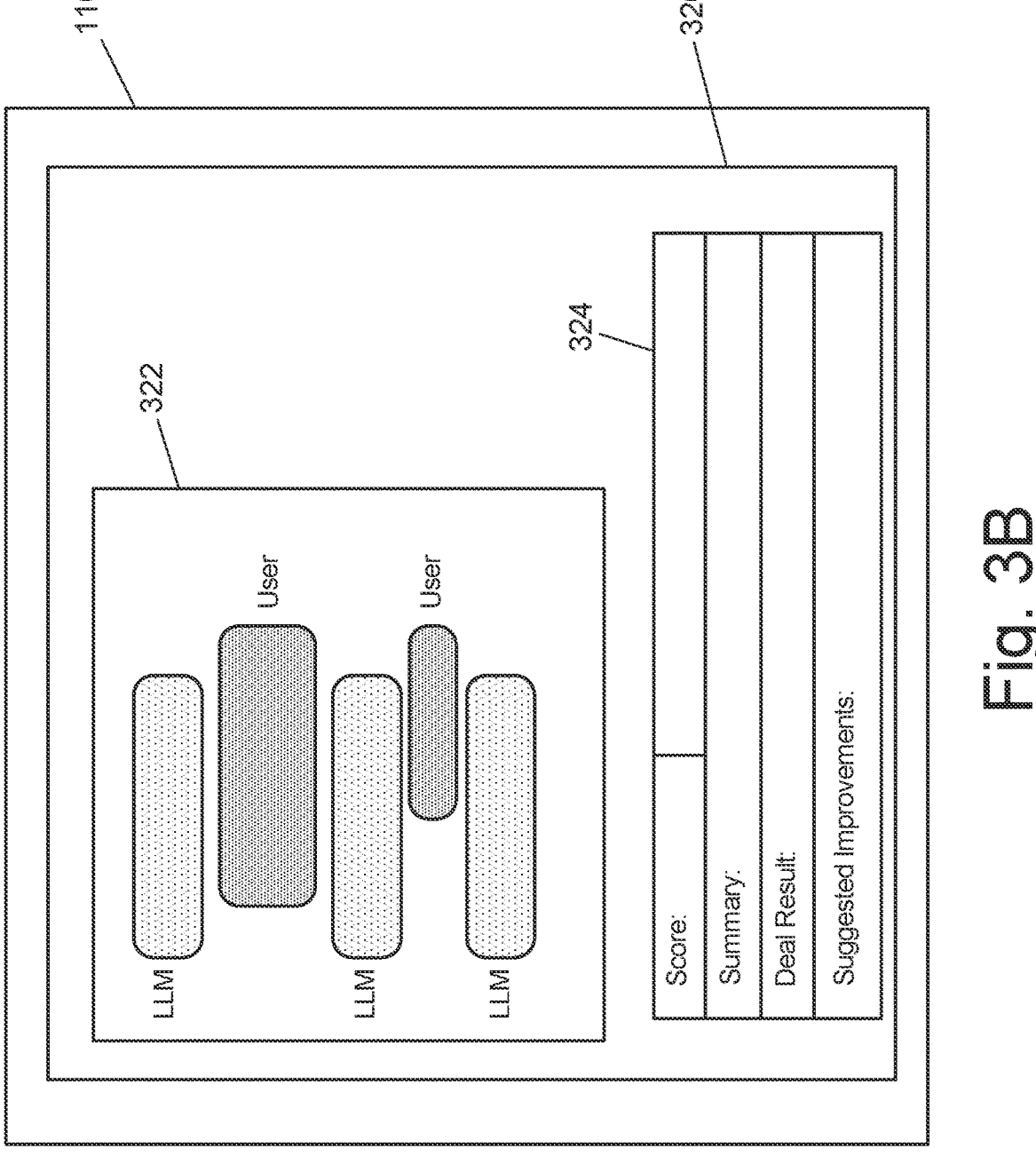
FIG. 3B is an example embodiment of a conversation and evaluation user interface for conversational training and evaluation of the user.

FIG. 3B is an example embodiment of conversation and evaluation user interface 320 for conversational training and evaluation of a sales associate. Conversation and evaluation user interface 320 is displayed on input/output device 110 of system 100. Conversation and evaluation user interface 320 includes conversational training interface 322 and evaluation interface 324. Conversational training interface 322 is used by the user to converse with large language model 120. Evaluation interface is populated with an evaluation of the conversation between large language model 120 and the user after the iterative conversation between the user and large language model is complete. Conversational training interface 322 provides a text based communicative user interface which allows for the user to send and receive messages from large language model 120. In some embodiments, conversational training interface 322 is displayed to the user after the encounter-defining parameters are provided within UI elements 302 (FIG. 3A). In some embodiments, large language model 120 presents a conversational opening statement via conversational training interface 322, wherein the conversational opening statement is based upon the encounter-defining parameters of UI elements 302. The user can then respond to the conversational opening statement via conversational training interface 322. The conversation between the user and large language model 120 can continue until a maximum number of responses is reached.

Upon reaching the maximum number of responses, evaluation interface 324 is populated and displayed to the user. Evaluation interface can include a numerical score on a defined scale, wherein the numerical score is indicative of the quality and likelihood of success in the interaction between the user and the simulated customer. Such a numerical evaluation can be displayed in the box entitled "Score" in evaluation interface 324. The evaluation can also include a summary of the user response, displayed in the box entitled "Summary" in evaluation interface 324. The evaluation can also include a deal result, wherein the deal result is indicative of whether a deal was successfully made between the user and the simulated customer. The deal result can be displayed in the box entitled "Deal Result" in evaluation interface 324. In some embodiments, the deal result is limited to either "success", indicating that a deal was reached, or "failure", indicating that no deal was reached. The evaluation can also include one or more suggested improvements for the user based upon an evaluation of the conversational encounter. The one or more suggested improvements can be displayed in the box entitled "Suggested Improvements" in evaluation interface 324.

Parameter defining user interface 300 and conversation and evaluation user interface 320 are examples of a possible user interface layouts to implement system 100 of FIG. 1. Parameter defining user interface 300 advantageously allows for the user to define custom parameters for an interaction with a simulated customer. Conversation and evaluation user interface 320 advantageously allows for the iterative conversation to occur and for the presentation of an evaluation to the user based upon the iterative conversation.

Figure 4:
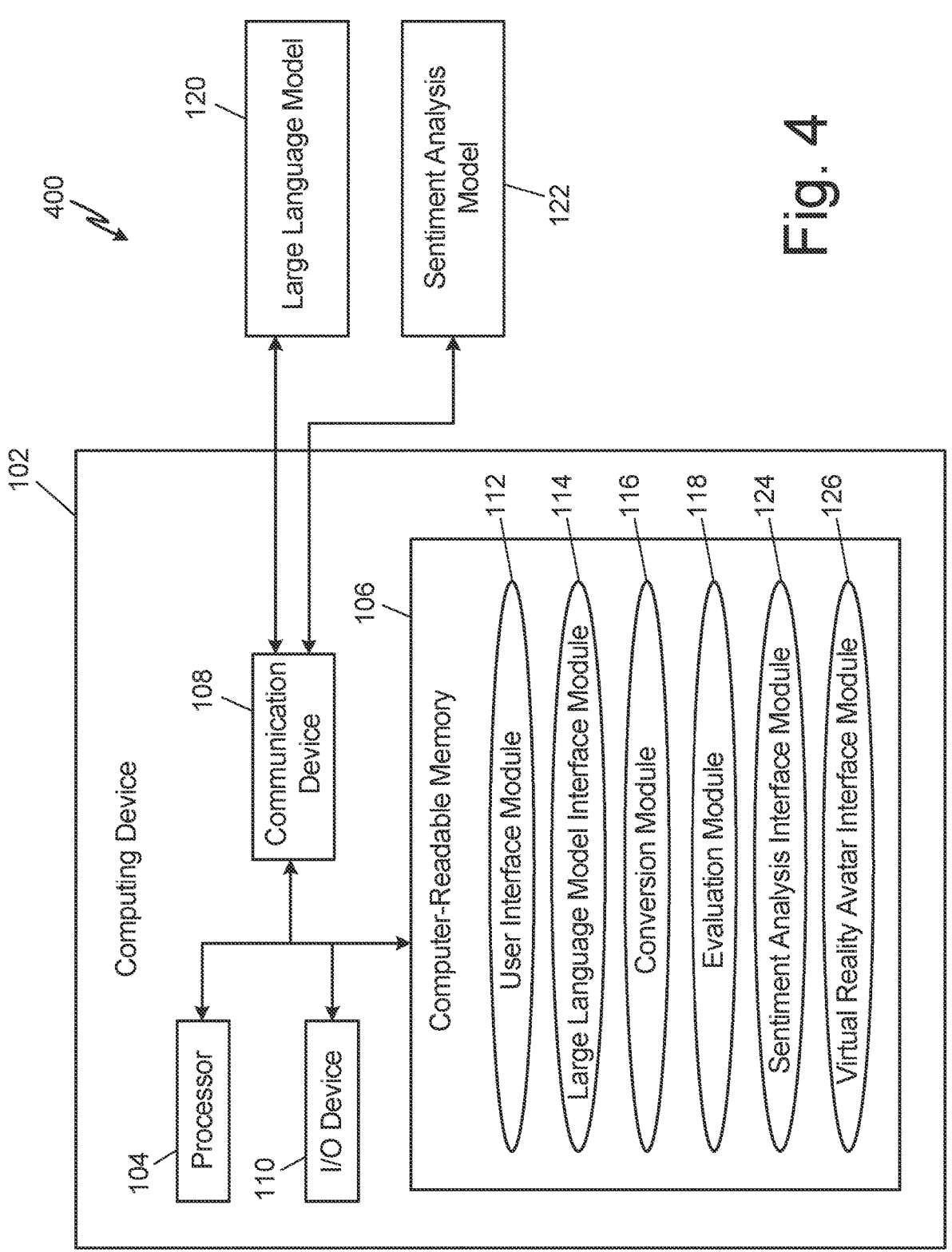
FIG. 4 is a diagram of an additional embodiment of the system for using generative artificial intelligence (AI) to train the user including sentiment analysis.

FIG. 4 depicts a diagram of system 400, wherein system 400 is an additional embodiment of system 100 for using generative artificial intelligence (AI) to train a sales associate. System 400, however, integrates sentiment analysis and virtual reality into the components of system 100. System 400 includes computing device 102, large language model 120, and sentiment analysis model 122. Computing device 102 includes processor 104, computer-readable memory 106, communication device 108, and input/output device 110. Computer-readable memory 106 includes user interface module 112, large language model interface module 114, conversation module 116, evaluation module 118, sentiment analysis interface module 124, and virtual reality avatar interface module 126.

Similar to the connections of system 100, processor 104, computer-readable memory 106, communication device 108, and input/output device 110 are interconnected within computing device 102 in system 400. Communication device 108 is operably connected to large language model 120 and to sentiment analysis model 122. Large language model 120 and sentiment analysis model 122 are depicted as external to computing device 102. In some embodiments, large language model 120 and/or sentiment analysis model 122 are hosted on a cloud server external to computing device 102. In other embodiments, large language model 120 and/or sentiment analysis model 122 are hosted on a local server external to computing device 102. In still other embodiments, large language model 120 and/or sentiment analysis model 122 can be hosted on a server contained within computing device 102.

In operation, system 400 operates in a similar manner to system 100. System 400 differs, however, in that the first input from communication device 108 to large language model 120 can include an instruction to respond to the user based, in part, on the sentiment of the user response. Thus, large language model 120 is configured to simulate the customer and situation as defined by the encounter-defining parameters and to respond based upon the sentiment of the user response. The additional elements of sentiment analysis interface module 124, virtual reality avatar interface module 126, and sentiment analysis model 122 function as follows.

Computer-readable memory 106 includes sentiment analysis interface module 124, which includes one or more programs for interfacing with sentiment analysis model 122 via communication device 108. The program(s) of sentiment analysis interface module 124 can be executed by processor 104. Sentiment analysis interface module 124 can be executed by processor 104 simultaneous to the execution of conversation module 116 by processor 104. Upon execution of sentiment analysis interface module 124, communication device 108 can provide the user response of an iteration of the iterative conversation between the user and the simulated customer to sentiment analysis model 122 prior to the user response being sent from communication device 108 to large language model 120.

Sentiment analysis model 122 can use preprocessing methods including tokenization, lemmatization, and stop-word removal filters on the user response. Sentiment analysis model 122 can use rule-based sentiment analysis, machine learning sentiment analysis, or any hybrid combination thereof. Sentiment analysis model 122 can produce fine-grained scoring to indicate the relative positivity or negativity of the user response. Sentiment analysis model can additionally or alternatively use emotional detection to interpret the sentiment of the user response based upon interpretation of various emotions as related to the user's word choice.

After providing the user response to sentiment analysis model 122, communication device 108 can receive a sentiment analysis score from sentiment analysis model 122. Communication device 108 can then provide the sentiment analysis score to large language model 120. As disclosed above, large language model 120 can include an instruction to respond to the user response based in-part upon the sentiment of the user response. Large language model can then provide a subsequent response to the user response, based upon the sentiment of the user response, as evaluated by sentiment analysis model 122. This process is repeated for the defined number of iterations.

In some embodiments, computer-readable memory 106 includes virtual reality avatar interface module 126, which includes one or more programs for generating a virtual reality display via input/output device 110. The program(s) of virtual reality avatar interface module 126 can be executed by processor 104. As described, large language model 120 can include an instruction to respond to the user response based, in part, upon the sentiment of the user response. The response from large language model 120 can thus include a response sentiment, indicative of the emotion of the response from large language model 120. Upon execution of virtual reality avatar interface module 126, processor 104 can generate a virtual reality avatar configured to be displayed to the user via input/output device 110. The virtual reality avatar can display the emotion of the response from large language model 120 as indicated by the response sentiment. In some embodiments, the virtual reality avatar can have a corresponding voice simulator, which is configured to relay the response from large language model 120 in a tone indicative of the response sentiment. Each iterative response received from large language model 120 can result in a re-render of the virtual reality avatar, indicative of the response sentiment of the most recent response.

In some embodiments, input/output device 110 is a virtual reality environment, wherein the user is speaking with the virtual reality avatar. In such an embodiment, system 400 can further include a voice-to-text conversion module such that the user input is converted from the user's voice into text and transmitted to large language model 120 via communication device 108. Large language model 120 can provide a reply via communication device, and the text of the reply from large language model 120 can be converted via a voice simulator and spoken by the virtual reality avatar in the appropriate emotional tone based upon the response sentiment.

At the conclusion of the iterative conversation between the user and large language model 120, evaluation module 118 is executed and an evaluation is displayed to the user via input/output device 110, as described above with respect to system 100. In system 400, evaluation module 118 can include additional instructions for large language model 120 to provide a summary of the sentiment of the user response to the user. Thus, once received from large language model 120 via communication device 108, a summary of the sentiment of the user response throughout the iterative conversation between the user and large language model 120 can be displayed to the user via input/output device 110 (e.g. textually or through virtual reality).

In some embodiments of system 400, the virtual reality avatar is configured to emulate and display the customer as defined by the encounter-defining parameters. Thus, at the beginning of the interaction, if the customer is defined as 'short-tempered and angry', the virtual reality avatar can provide a depiction of such a customer based on facial expressions, voice simulation, or other features indicative of the customer's disposition. In some embodiments, the customer can be predisposed to certain emotions. Such predispositions can be defined in the encounter-defining parameters. For example, a customer could be predisposed to a joking demeanor and thus can be receptive to humor from the user. In such an example, the virtual reality avatar can be rendered as happy and/or laughing to depict its predisposed demeanor.

System 400 provides various advantages in addition to those described with respect to system 100. System 400 allows for additional training with respect to the sentiment of a user response. Thus, where the user may be providing relevant information to the simulated customer but is doing so with a negative sentiment that would lead to an adverse response in a real-world interaction, system 400 can flag such a negative sentiment and respond in-kind to the user. Additionally, the user can be notified, via the summary of the sentiment of the user response, as to how their communications are received by the simulated customer. Such analysis allows for improved training of the user. Furthermore, the integration of virtual reality can enhance the user experience, allowing the user to visually and audibly experience the response sentiment from the simulated customer.

Figure 5:
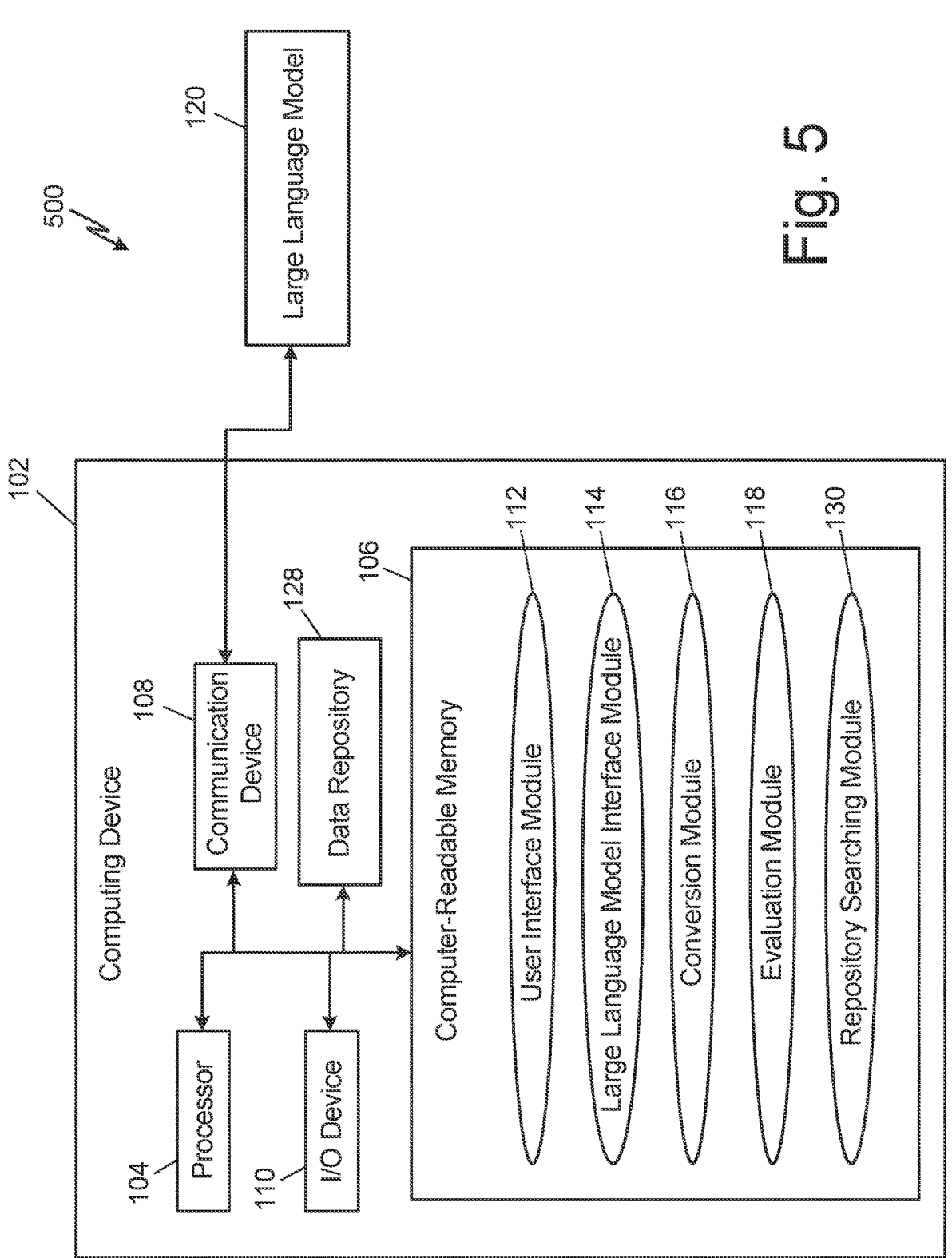
FIG. 5 is a diagram of an additional embodiment of the system for using generative artificial intelligence (AI) to train the user including a data repository for suggested responses.

FIG. 5 depicts a diagram of system 500, wherein system 500 is an additional embodiment of system 100 for using generative artificial intelligence (AI) to train a sales associate. System 500, however, integrates a data repository for suggested responses into the components of system 100. System 500 includes computing device 102, large language model 120, and data repository 128. Computing device 102 includes processor 104, computer-readable memory 106, communication device 108, and input/output device 110. Computer-readable memory 106 includes user interface module 112, large language model interface module 114, conversation module 116, evaluation module 118, and repository searching module 130.

Processor 104, computer-readable memory 106, communication device 108, input/output device 110, and data repository 128 are interconnected within computing device 102 of system 500. Communication device 108 is operably connected to large language model 120. Large language model 120 is depicted as being external to computing device 102. In some embodiments, large language model 120 is hosted on a cloud server external to computing device 102. In other embodiments, large language model 120 is hosted on a local server external to computing device 102. In still other embodiments, large language model 120 can be hosted on a server contained within computing device 102. Similarly, data repository 128 can be hosted on a cloud server, on a local server, or within computing device 102 (as depicted).

System 500 operates in a similar manner to system 100. System 500 differs, however, in that the first input from communication device 108 to large language model 120 can include an instruction to respond to the user with one or more suggestions on how to respond back to the simulated customer in order to achieve a favorable outcome. Thus, large language model 120 is configured to simulate the customer and situation as defined by the encounter-defining parameters and to provide recommended responses to the simulated customer. The additional elements of data repository 128 and repository searching module 130 function as follows.

Repository searching module 130 includes one or more programs for interfacing with data repository 128. The program(s) of repository searching module 130 can be executed by processor 104. Upon execution of repository searching module 130, the contents of data repository 128 can be transferred to large language model 120 via communication device 108. The contents of data repository 128 can include documents, presentations, or other data relevant to the user. The contents of data repository 128 can be materials associated with past sales or prior customer projects.

After the contents of data repository 128 have been shared with large language model 120, and after large language model 120 has generated a response to a user response of an iteration of the iterative conversation, large language model 120 is instructed to generate one or more suggested responses for the user. The user can use such a response in reply to the simulated customer for the next iteration of the iterative conversation. The suggested response is a response that will further the goal of achieving a favorable outcome within the evaluation after the maximum number of responses is reached. In addition, large language model 120 can search the contents of data repository 128 to find supporting documents or other evidence that may be favorable and relevant to the one or more suggested responses. Large language model 120 can provide this information via communication device 108 for display to the user via input/output device 110. Thus, in system 500, the user is in iterative conversation with large language model 120 while large language model 120 is also supplying the user with suggested responses and supporting evidence such that the user need only follow the suggestions of large language model 120 in order to achieve a favorable conversational outcome.

An example of the operation of system 500 can include a user in conversation with a simulated customer, wherein the business requirement is productivity-enhancing measures for a large technology company. Large language model 120 can provide a conversational opening statement listing the set of encounter-defining parameters, including the defined business requirement. The user may, for example, respond by indicating that the user has extensive experience in providing productivity-enhancing measures to client companies. Large language model 120 may, for example, generate an LLM response asking for examples of the user's past experience and ideas for productivity-enhancing measures. Prior to providing this response to the user, large language model 120 can then generate a suggested response for the user based upon which response would result in a favorable evaluation of the conversation by large language model 120. Large language model 120 can also search the contents of data repository 128 for data that supports the user response.

Thus, for example, large language model 120 can suggest a response wherein the user should reply indicating that a change in the corporate structure from a linear organization to a matrix organization is one method of enhancing productivity. This response is generated based on an evaluation by large language model 120 indicating that such a response would result in a favorable evaluation of the conversational encounter. Large language model 120 can also search the contents of data repository 128 to find supporting material. Large language model 120 can find and cite, for example, a consulting presentation created for xyz corporation indicating that a change in corporate structure positively impacted productivity. Large language model can then supply the LLM response, the suggested user response, and the suggested supporting material from data repository 128 for the user to view on input/output device 110 via communication device 108. The preceding is merely meant to be an example of a non-limiting embodiment of system 500.

System 500 provides various advantages in addition to those described with respect to system 100. System 500 allows for operation in a 'training mode' such that a user is trained by the system suggesting responses that will result in a favorable evaluation at the end of the conversation between the user and the simulated customer. Thus, as described, the user need only follow the suggestions of large language model 120 in order to achieve a favorable conversational outcome. System 500 can be used, for example, to train the user on how to structure responses, before allowing the user to use the embodiments of system 100 or system 400, where the user responds to the simulated customer without suggested responses. Thus, the user can become adept at responding and learn more about data available in the repository for bolstering user responses prior to responding without such suggestions.

The methods and systems described herein advantageously allow for the training of a user based upon custom parameters defined prior to a simulated conversation with a large language model. The system and methods provide such training by providing customized instructions to the large language model that result in an iterative conversation between the user and the large language model. At the end of the iterative conversation, the user is provided with an evaluation that is indicative of the user's performance during the conversation and the relative success of the user in achieving the conversational goal (e.g. to reach a sales deal). Thus, the various embodiments described herein are advantageous for customized training of users in conversational encounters.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the present disclosure.

Discussion of Possible Embodiments

The following are non-exclusive descriptions of possible embodiments of the present invention.

A system for using generative artificial intelligence (AI) for training a user for a conversational encounter with a customer includes a processor, an input/output device, and computer-readable memory. The input/output device is configured to receive user inputs and to display outputs at a user interface. The computer-readable memory is encoded with instructions that, when executed by the processor, cause the system to perform the following steps. The system receives, from the user interface, a set of encounter-defining parameters, the encounter-defining parameters being descriptive of attributes of the conversational encounter. The system formats the set of encounter-defining parameters into a first large language model input, the first large language model input being suitable for processing by a large language model. The system provides the large language model input to the large language model. The system receives a first large language model output from the large language model based upon the first large language model input. The system provides the first large language model output to the user via the user interface. The system iteratively converses, via the user interface, with the user for a defined number of iterations. Iteratively conversing with the user includes the steps of receiving a user response via the user interface, providing the user response to the large language model, receiving an additional large language model output from the large language model, and providing the additional large language model output to the user via the user interface. The system provides an evaluation command to the large language model after the defined number of iterations is reached. The system receives a final evaluation from the large language model, the final evaluation being indicative of an evaluated outcome of the conversational encounter. The system displays the final evaluation to the user via the user interface.

The system of the preceding paragraph can optionally include, additionally and/or alternatively, any one or more of the following features, configurations and/or additional components.

In a further embodiment of the foregoing system, the first large language model output provides a conversational opening statement from the customer that adheres to the set of encounter-defining parameters.

In a further embodiment of any of the foregoing systems, the set of encounter-defining parameters include a set of customer-defining parameters and a set of situation-defining parameters.

In a further embodiment of any of the foregoing systems, the set of customer-defining parameters include at least one of a personality, a mood, an industry, and a customer role, a team requirement, and a business requirement.

In a further embodiment of any of the foregoing systems, the set of situation-defining parameters include at least one of a team requirement and a business requirement.

In a further embodiment of any of the foregoing systems, the first large language model input includes instructions to evaluate a direction of the user response, the direction of the user response being indicative of the relevance of the user response and the direction of the user response is displayed to the user via the user interface.

In a further embodiment of any of the foregoing systems, the final evaluation includes a numerical score on a predefined scale.

In a further embodiment of any of the foregoing systems, the final evaluation includes a summary of the user response.

In a further embodiment of any of the foregoing systems, the final evaluation includes a deal result based upon the user response. The deal result is indicative of whether a deal is accepted or rejected.

In a further embodiment of any of the foregoing systems, the final evaluation includes one or more suggested improvements based upon the user response.

In a further embodiment of any of the foregoing systems, iteratively conversing with the user further includes transmitting a conversation history to the large language model. The conversation history includes prior iterations of the user response and prior iterations of the additional large language model output.

In a further embodiment of any of the foregoing systems, iteratively conversing with the user further includes transmitting the user response to a sentiment analysis module. The sentiment analysis module produces an emotional index of the user response.

In a further embodiment of any of the foregoing systems, iteratively conversing with the user further includes transmitting the emotional index of the user response from the sentiment analysis module to the one or more large language models.

In a further embodiment of any of the foregoing systems, iteratively conversing with the user further includes transmitting the emotional index of the user response from the sentiment analysis module to the large language model.

In a further embodiment of any of the foregoing systems, the final evaluation includes a summary of the emotional index of the user response.

In a further embodiment of any of the foregoing systems, the computer-readable memory is further encoded with instructions that, when executed by the one or more processors, cause the system to generate a virtual reality avatar. The virtual reality avatar is configured to emulate the customer as defined by the encounter-defining parameters and to display the virtual reality avatar to the user.

In a further embodiment of any of the foregoing systems, the virtual reality avatar is configured to display a corresponding response emotion to the user based upon the emotional index of the user response.

In a further embodiment of any of the foregoing systems, the virtual reality avatar is configured to be predisposed to an emotional range as defined in the first large language model input.

In a further embodiment of any of the foregoing systems, the computer-readable memory is further encoded with instructions that, when executed by the one or more processors, cause the system to suggest one or more rectified responses to the user. The one or more rectified responses are indicative of responses that improve the final evaluation.

In a further embodiment of any of the foregoing systems, the computer-readable memory is further encoded with instructions that, when executed by the one or more processors, cause the system to search a repository of user data to determine whether there exists information favorable to the user for the one or more rectified responses, and to display the information favorable to the user for the one or more rectified responses alongside the one or more rectified responses.

A method for training a user for a conversational encounter with a customer includes receiving from a user interface, a set of encounter-defining parameters, the encounter-defining parameters being descriptive of attributes of the conversational encounter. The method further includes formatting the set of encounter-defining parameters into a first large language model input, the first large language model input being suitable for processing by a large language model. The method further includes providing the large language model input to the large language model. The method further includes receiving a first large language model output from the large language model based upon the first large language model input. The method further includes providing the first large language model output to the user via the user interface. The method further includes iteratively conversing, via the user interface, with the user for a defined number of iterations, wherein iteratively conversing with the user includes the steps of receiving a user response via the user interface, providing the user response to the large language model, receiving an additional large language model output from the large language model, and providing the additional large language model output to the user via the user interface. The method further includes providing an evaluation command to the large language model after the defined number of iterations is reached. The method further includes receiving a final evaluation from the large language model, the final evaluation being indicative of an evaluated outcome of the conversational encounter. The method further includes displaying the final evaluation to the user via the user interface.

In a further embodiment of the foregoing method, the first large language model input includes instructions to evaluate a direction of the user response that is indicative of the relevance of the user response and the direction of the user response is displayed to the user via the user interface.

In a further embodiment of any of the foregoing methods, the final evaluation includes one or more suggested improvements to the user response.

In a further embodiment of any of the foregoing methods, iteratively conversing with the user further includes transmitting a conversation history to the large language model. The conversation history includes prior iterations of the user response and prior iterations of the additional large language model output.

In a further embodiment of any of the foregoing methods, iteratively conversing with the user further includes transmitting the user response to a sentiment analysis module. The sentiment analysis module produces an emotional index of the user response.

In a further embodiment of any of the foregoing methods, iteratively conversing with the user further includes transmitting the emotional index of the user response from the sentiment analysis module to the large language model and instructing the large language model instruction to respond to the user response based upon the emotional index of the user response.

The invention claimed is:

1. A system for using generative artificial intelligence (AI) for training a user for a conversational encounter with a customer, the system comprising:

a processor;

an input/output device operably connected to the processor, the input/output device configured to receive user inputs and to display outputs at a user interface; and computer-readable memory operably connected to the processor, the computer-readable memory encoded with instructions that, when executed by the processor, cause the system to:

receive, from the user interface, a set of encounter-defining parameters, the encounter-defining parameters being descriptive of attributes of the conversational encounter;

format the set of encounter-defining parameters into a first large language model input, the first large language model input being suitable for processing by a large language model;

provide the first large language model input to the large language model, the large language model configured to generate a first large language model output based upon the first large language model input;

receive the first large language model output from the large language model;

provide the first large language model output to the user via the user interface;

iteratively converse with the user, via the user interface, for a defined number of iterations, wherein iteratively conversing with the user includes the steps of:

receiving a user response via the user interface;

providing the user response to the large language model, the large language model configured to generate an additional large language output;

receiving the additional large language model output; and providing the additional large language model output to the user via the user interface;

provide an evaluation command to the large language model after the defined number of iterations is reached, the large language model configured to generate a final evaluation indicative of the quality of the conversational encounter based on the iterative conversation between the user and the large language model;

receive the final evaluation from the large language model; and display the final evaluation to the user via the user interface.

2. The system of claim 1, wherein the first large language model output provides a conversational opening statement from the customer that adheres to the set of encounter-defining parameters.

3. The system of claim 1, wherein the set of encounter-defining parameters include a set of customer-defining parameters and a set of situation-defining parameters.

4. The system of claim 3, wherein the set of customer-defining parameters include at least one of a personality, a mood, an industry, and a customer role, a team requirement, and a business requirement.

5. The system of claim 3, wherein the set of situation-defining parameters include at least one of a team requirement and a business requirement.

6. The system of claim 1, wherein:

the first large language model input includes instructions to evaluate a direction of the user response that is indicative of the relevance of the user response; and the direction of the user response is displayed to the user via the user interface.

7. The system of claim 1, wherein the final evaluation includes a numerical score on a predefined scale.

8. The system of claim 1, wherein the final evaluation includes a summary of the user response.

9. The system of claim 1, wherein the final evaluation includes a deal result based upon the user response, wherein the deal result is indicative of whether a deal is accepted or rejected.

10. The system of claim 1, wherein the final evaluation includes one or more suggested improvements to the user response.

11. The system of claim 1, wherein iteratively conversing with the user further includes:

transmitting a conversation history to the large language model, wherein the conversation history includes prior iterations of the user response and prior iterations of the additional large language model output.

12. The system of claim 1, wherein iteratively conversing with the user further includes:

transmitting the user response to a sentiment analysis module, wherein the sentiment analysis module produces an emotional index of the user response.

13. The system of claim 12, wherein iteratively conversing with the user further includes:

transmitting the emotional index of the user response from the sentiment analysis module to the large language model.

14. The system of claim 13, wherein the first large language model input includes an instruction to respond to the user input based upon the emotional index of the user response.

15. The system of claim 14, wherein the final evaluation includes a summary of the emotional index of the user response.

16. The system of claim 15, wherein the computer-readable memory is further encoded with instructions that, when executed by the one or more processors, cause the system to:

generate a virtual reality avatar, wherein the virtual reality avatar is configured to emulate the customer as defined by the encounter-defining parameters; and display the virtual reality avatar to the user.

17. The system of claim 16, wherein the virtual reality avatar is configured to display a corresponding response emotion to the user based upon the emotional index of the user response.

18. The system of claim 16, wherein the virtual reality avatar is configured to be predisposed to an emotional range as defined in the first large language model input.

19. The system of claim 1, wherein the computer-readable memory is further encoded with instructions that, when executed by the one or more processors, cause the system to:

suggest one or more rectified responses to the user, wherein the one or more rectified responses are indicative of responses that improve the final evaluation.

20. The system of claim 19, wherein the computer-readable memory is further encoded with instructions that, when executed by the one or more processors, cause the system to:

search a repository of user data to determine whether there exists information favorable to the user for the one or more rectified responses; and display the information favorable to the user for the one or more rectified responses alongside the one or more rectified responses.

21. A method for training a user for a conversational encounter with a customer, the method comprising:

receiving, via a processor, a set of encounter-defining parameters from a user interface, the encounter-defining parameters being descriptive of attributes of the conversational encounter;

formatting, via the processor, the set of encounter-defining parameters into a first large language model input, the first large language model input being suitable for processing by a large language model;

providing, via the processor, the large language model input to the large language model;

generating, via the large language model, a first large language model output based upon the first large language model input;

receiving, via the processor, the first large language model output from the large language model;

providing, via the processor, the first large language model output to the user via the user interface;

iteratively conversing, via the user interface, with the user for a defined number of iterations, wherein iteratively conversing with the user includes the steps of:

receiving, via the processor, a user response via the user interface;

providing, via the processor, the user response to the large language model;

generating, via the large language model, an additional large language model output;

receiving, via the processor, the additional large language model output from the large language model; and providing, via the processor, the additional large language model output to the user via the user interface;

providing, via the processor, an evaluation command to the large language model after the defined number of iterations is reached;

generating, via the large language model, a final evaluation indicative of an evaluated outcome and/or a quality the conversational encounter based on the iterative conversation between the user and the large language model;

receiving, via the processor, the final evaluation from the large language model; and displaying, via the processor, the final evaluation to the user via the user interface.

22. The method of claim 21, wherein:

the first large language model input includes instructions to evaluate a direction of the user response that is indicative of the relevance of the user response; and the direction of the user response is displayed to the user via the user interface.

23. The method of claim 21, wherein the final evaluation includes one or more suggested improvements to the user response.

24. The method of claim 21, wherein iteratively conversing with the user further includes:

transmitting, via the processor, a conversation history to the large language model, wherein the conversation history includes prior iterations of the user response and prior iterations of the additional large language model output.

25. The method of claim 21, wherein iteratively conversing with the user further includes:

transmitting, via the processor, the user response to a sentiment analysis module, wherein the sentiment analysis module produces an emotional index of the user response.

26. The method of claim 25, wherein iteratively conversing with the user further includes:

transmitting, via the processor, the emotional index of the user response from the sentiment analysis module to the large language model; and instructing, via the processor, the large language model instruction to respond to the user response based upon the emotional index of the user response.

\* \* \* \* \*